Aug. 12, 1969　　　　J. PACZA　　　　3,461,023
DECORATIVE MOTION DEVICE
Filed Jan. 17, 1966　　　　3 Sheets-Sheet 3
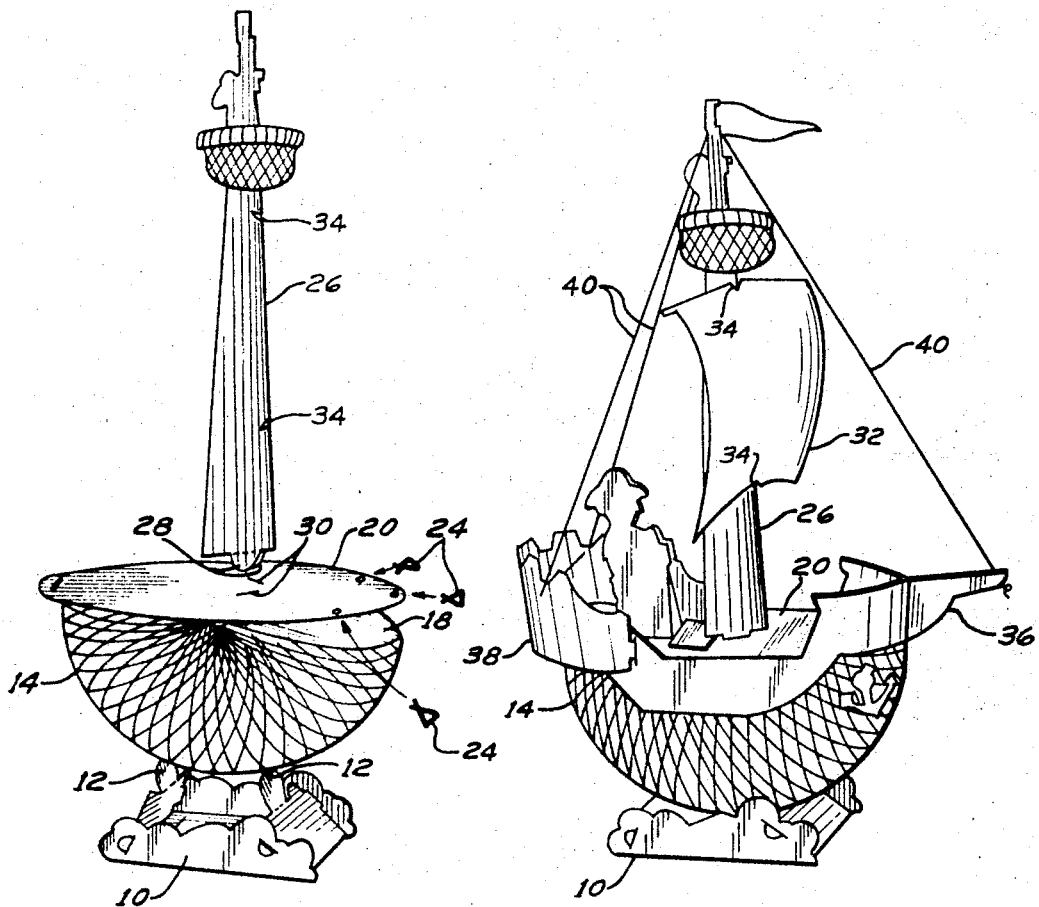
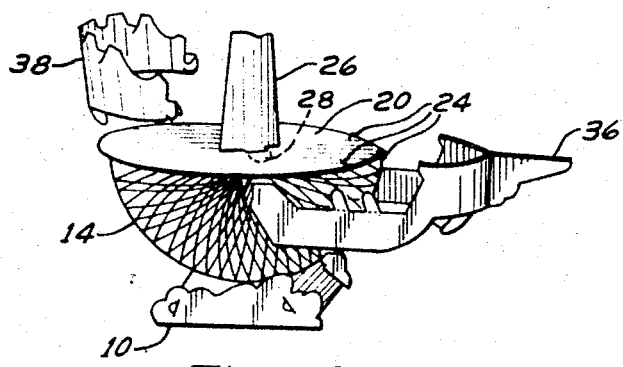
INVENTOR.
John Pacza
BY
Meyer, Tilberry & Body
ATTORNEYS.

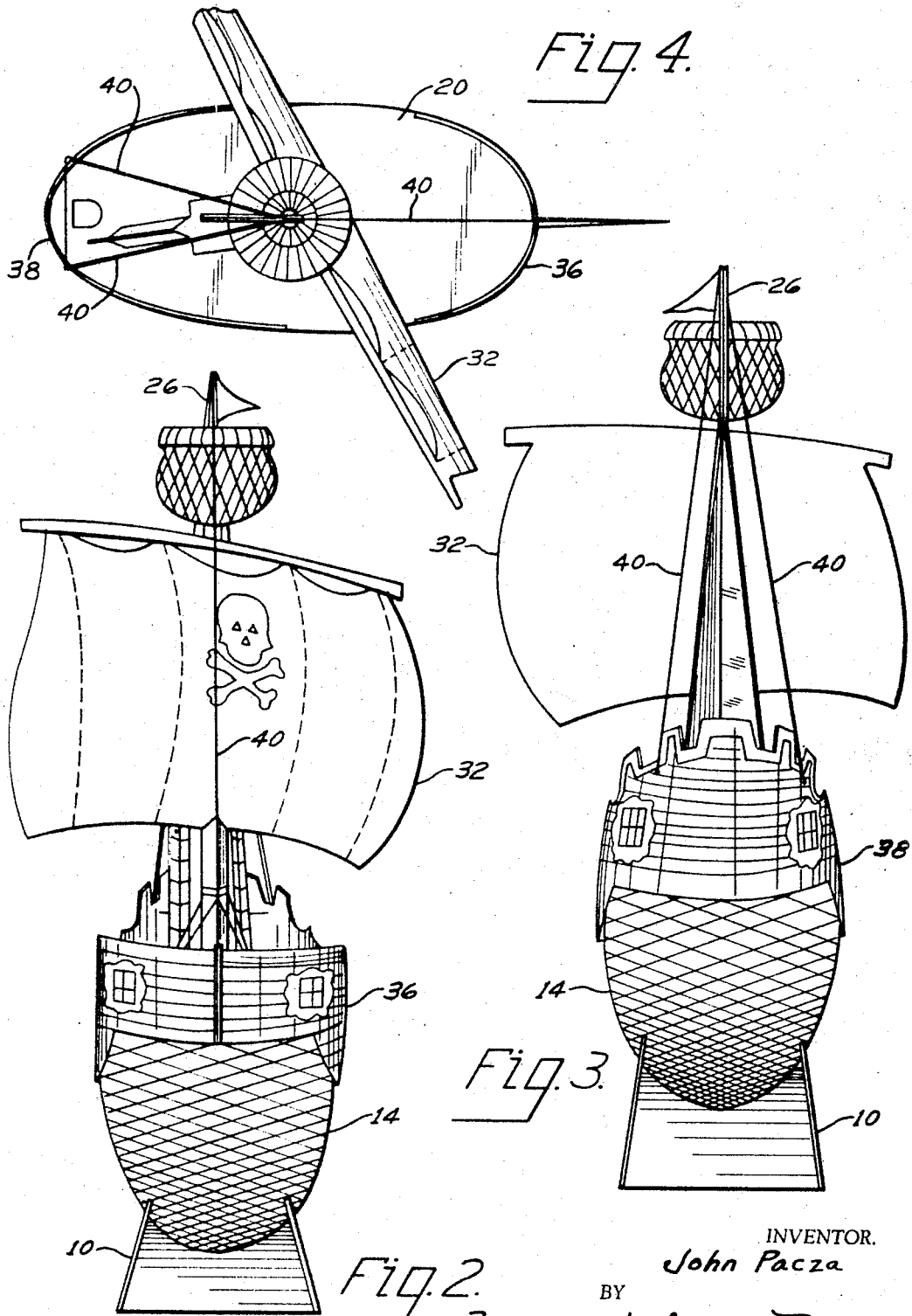

United States Patent Office 3,461,023
Patented Aug. 12, 1969

3,461,023
DECORATIVE MOTION DEVICE
John Pacza, Parma, Ohio, assignor to American Greetings Corporation, Cleveland, Ohio, a corporation of Ohio
Filed Jan. 17, 1966, Ser. No. 521,124
Int. Cl. B63h 23/02
U.S. Cl. 161—17                                          4 Claims

ABSTRACT OF THE DISCLOSURE

A decorative motion device comprising a base, a rockable motion member supported on the base, the motion member including first and second stiff backing sheets, the first backing sheet foldable about a hinge line, and an elastic element formed of thin flexible leaves of sheet material interconnected to form a honeycomb structure having an expandable dimension, the element having two end surfaces perpendicular to the expandable dimension, one of the end surfaces being attached to the first backing sheet and the other of the end surfaces being attached to the second backing sheet, the attachment being on opposite sides of the hinge line whereby when the first backing sheet is unfolded, the elastic element is expanded arcuately about the hinge axis to define a segment of a surface of revolution, display elements mounted on the second backing sheet, and means for retaining the first backing sheet in an unfolded condition whereby the motion member is rockable on the base about the hinge line in response to oscillating expansion and contraction of opposite portions of the elastic element.

---

The present invention relates to decorative display devices and more particularly to a decorative motion device especially suitable for use as a centerpiece at children's parties and other festive occasions.

With the pressure of complex modern-day living, it has become the custom to assemble groups of people—both children and adults—in varying numbers to enjoy eating and fellowship together, and frequently decorations and displays of various kinds are used on such occasions to enhance and beautify the surroundings. Also, desks, tables, and mantel pieces are frequently decorated in order to appeal to the esthetic nature of the occupants.

Heretofore, collapsible ornamental devices have been provided including backing sheets connected to a flexible elastic honeycomb structure formed of tissue paper or other thin sheet material. By folding the backing sheets about a hinge line, the honeycomb structure is expanded arcuately into an ornamental shape generally defining at least a segment of a surface of revolution.

The elastic honeycomb structure generally comprises a plurality of adjacent and superposed leaves or plies joined together on spaced linear seams and which are generally sold in a flat folded condition but which may be unfolded to expand the leaves or plies in an arc. The expanded structure is generally maintained in the expanded condition using suitable well-known means.

Ornaments of this character have been made and marketed for many years but have not been used to provide the mobile element of a decorative motion device of the type wherein the ornamental character of the decoration is enhanced by a motion capability.

The present invention provides a new and improved decorative motion device which provides supplemental entertainment features not heretofore available.

According to the construction of the present invention, there is provided a decorative moiton device which may be in the form of a rockable seagoing vessel model or other ornamental article including a rockable motion member supported on a stationary base. The motion member includes stiff backing sheets which are connected along a hinge line, and an elastic element formed of thin flexible leaves or plies of sheet material interconnected to form a honeycomb structure having an expandable dimension. The end surfaces of the elastic element perpendicular to the expandable dimension are attached to the backing sheets on opposite sides of the hinge line so that when the backing sheets are unfolded, the elastic element is expanded arcuately about the hinge line to define a segment of a surface of revolution. The elastic element is mounted on the base so that the backing sheet is preferably substantially horizontal and the display elements are mounted on the backing sheet to provide the desired decorative character. Means are provided for retaining the backing sheet in its unfolded condition after the device is constructed so that the motion member is rockable on the base about the hinge axis in response to oscillating harmonic expansion and contraction of the end portions of the elastic element on opposite sides of the base.

Various uses and advantages of the invention will become apparent from the following detailed description and drawings forming a part of the specification, like parts being identified by like numerals, and wherein:

FIGURE 2 is a front elevational view of the motion device of FIGURE 1;

FIGURE 3 is a rear elevational view of the motion device of FIGURE 1;

FIGURE 4 is a plan view of the motion device of FIGURE 1;

FIGURE 5 is an exploded perspective view of the decorative motion device of FIGURE 1 illustrating the preliminary assembly of various parts thereof;

FIGURE 6 is a fragmentary exploded perspective view of the decorative motion device of FIGURE 1 illustrating the assembly of additional parts thereof; and FIGURE 7 is a perspective view illustrating the complete assembly of the decorative motion device of FIGURE 1.

Figure 1:
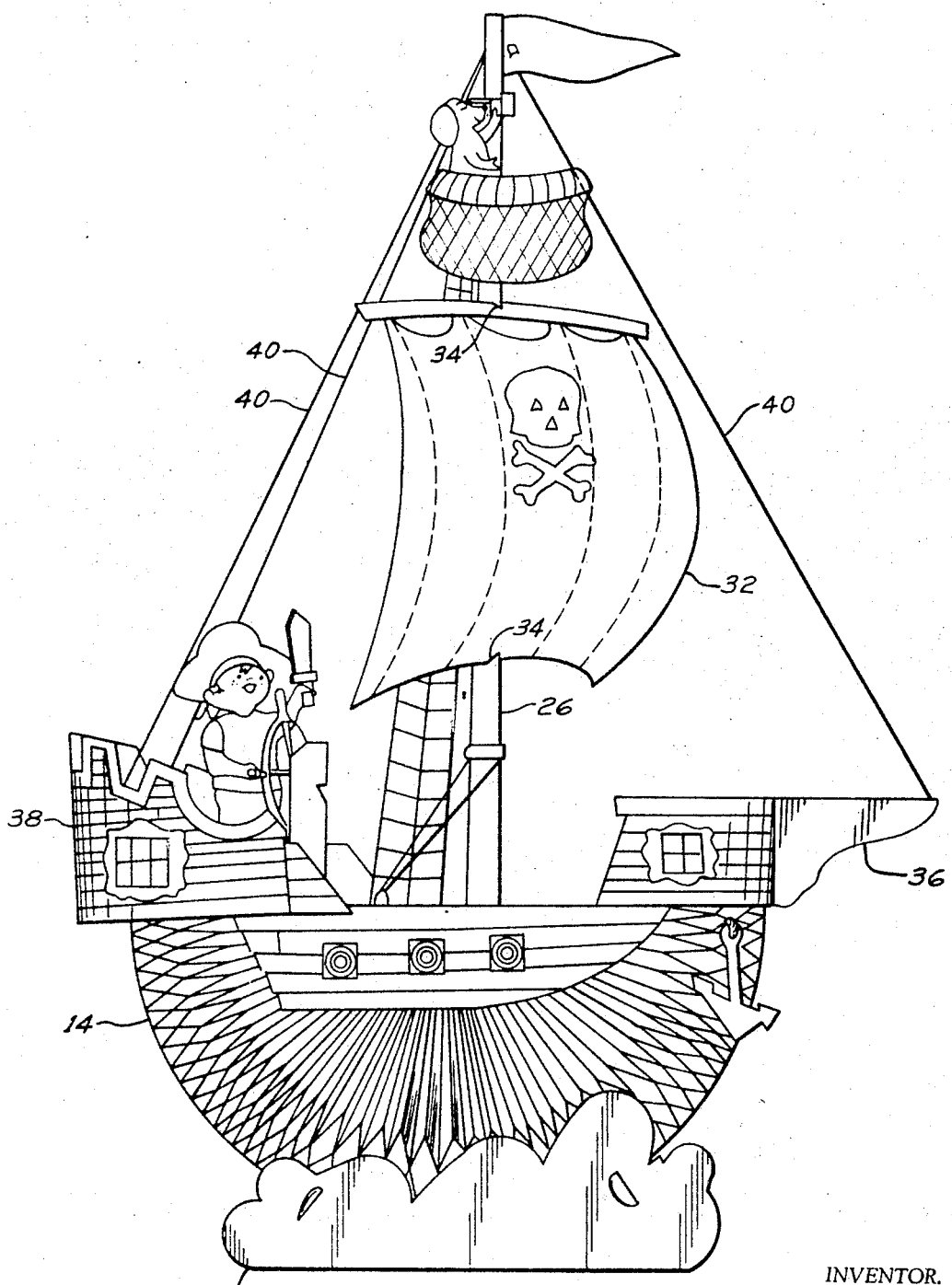
FIGURE 1 is a side elevational view of a decorative motion device embodying the invention.

Referring more particularly to the drawings, there is shown a decorative motion device of the type embodying the invention. For the purpose of illustration the device shown is adapted to resemble a pirate ship appropriately termed the "Jolly Roger." This particular construction is suitable as a novelty gift, a party centerpiece or as a toy for small children. Most of the parts for the device may be cut from flat sheets of cardboard or other sheet material and the entire unit may be sold in kit form in a flat package or paper envelope.

The assembly of the device should be sufficiently simple to permit assembly by small children.

In assembled relation, the device comprises a base 10 composed of flat stiff sheet material such as cardboard suitably cut and folded as shown and including two upwardly extending tabs 12. Mounted on the base by means of the tabs 12 is an elastic element 14 formed of thin flexible leaves or plies of sheet material such as tissue paper, interconnected along linear seams to form a honeycomb structure which is expandable in a direction perpendicular to the plane of the leaves or plies.

The elastic element 14 has end faces perpendicular to the expandable dimension thereof and connected or adhered to flat backing sheets 18 and 20 preferably formed of stiff cardboard.

The elastic element 14 is semielliptical in radial cross-section and the backing sheet 18 is cut to match the shape and adhered to one end face thereof as shown in FIGURE 5. The backing sheet 20 is of elliptical form and is of sufficient size so that the peripheral edge portion thereof extends slightly beyond the end faces of the elastic element 14. The backing sheet 18 is pivotally connected to the backing sheet 20 along a transverse hinge line and is adapted to unfold from a position wherein the elastic element is collapsed to a relatively flat condition, to a condition as shown in the drawings wherein the backing sheet 18 is positioned against one half of the backing sheet 20, the elastic element 14 being expanded arcuately about the hinge axis to define a segment of a surface of revolution as best shown in FIGURE 6.

Because the elasticity of the element 14 tends to fold the backing sheet 18 back to the collapsed condition, the sheet 18 is firmly connected to the backing sheet 20 by means of clips 24 as best shown in FIGURES 5 and 6.

The backing sheet 20 provides a deck for a pirate ship display to be mounted thereon. The display elements include a mast 26 having tabs 28 formed on the bottom thereof which are received in slots 30 formed in the central portion of the backing sheet 20. A sail 32 is mounted in the mast by means of notches 34.

Also included as display elements forming a part of the ship's superstructure are a bow element 36 and a stern element 38, both being attached to the backing sheet 20 as shown in FIGURE 6. The mast 26 may be further supported by means of guy lines 40 which provide additional rigidity to the mast and superstructure.

Due to the elasticity of the element 14, the device is capable of rocking movement about the aforementioned hinge line whenever a force is exerted on the device to rock it out of its neutral position. Such movement will cause oscillating expansion and contraction of the end portions of the elastic element 14 located on opposite sides of the base 10 to provide a harmonic motion of decreasing amplitude. The harmonic motion will, of course, be dampened out after several oscillations and the device will return to its neutral position.

The mechanical movement of the elastic element 14 derives from the rocking of the rigid backing sheet 20 about the hinge axis so that when the bow element 36 of the display is moved downwardly, the portion of the elastic element 14 lying between the base 10 and the bow element 36 is compressed while the portion of the elastic element lying between the stern element 38 and the base 10 is expanded. Once the bow element 36 is released, the stored energy moves the bow element 36 upwardly and the stern element 38 downwardly simultaneously, the energy release in the elastic element 14 being sufficient to lower the stern element 38 to a position lower than its neutral position and raise the bow element 36 accordingly. Thus the elastic element oscillates back and forth harmonically about the hinge line until the oscillations are dampened out and the device returns to a stable condition.

The display elements mounted on the backing sheet 20 serve to raise the center of gravity of those portions of the device located above the hinge axis. This decreases the stability of the device and increases the duration of the harmonic rocking movements once the device has been set in motion. Other types of rocking displays may, of course, be mounted on the elastic element 14 if desired, such as a horse and rider and various vehicles.

While the invention has been described with reference to a specific embodiment thereof, other modifications and variations will occur upon a reading and understanding of the specification. Accordingly, changes and modifications may be made without departing from the spirit of the invention.

Having thus described my invention, I claim:

1. A decorative motion device comprising a base, a rockable motion member supported on said base, said motion member including first and second stiff backing sheets said first backing sheet foldable about a hinge line, and an elastic element formed of thin flexible leaves of sheet material interconnected to form a honeycomb structure having an expandable dimension, said element having two end surfaces perpendicular to said expandable dimension one of said surfaces being attached to said first backing sheet and the other of said surfaces being attached to said second backing sheet said attachments being on opposite sides of said hinge line whereby when said first backing sheet is unfolded, said elastic element is expanded arcuately about said hinge axis to define a segment of a surface of revolution, display elements mounted on said second backing sheet, and means for retaining said first backing sheet in an unfolded condition whereby said motion member is rockable on said base about said hinge line in response to oscillating expansion and contraction of opposite portions of said elastic element.

2. A device as defined in claim 1 wherein said honeycomb structure has a semielliptical radial cross section.

3. A device as defined in claim 1 wherein said honeycomb structure defines 180° of a surface of revolution.

4. A device as defined in claim 1 wherein said device is in the form of a seagoing vessel model.

References Cited

UNITED STATES PATENTS

| | | | |
|---|---|---|---|
| 1,616,568 | 2/1927 | Beistle | 161—17 |
| 1,809,635 | 6/1931 | Luhrs | 161—14 |
| 3,046,684 | 7/1962 | Tritt | 161—14 |

JACOB H. STEINBERG, Primary Examiner